United States Patent
Bartels

(10) Patent No.: US 10,453,230 B2
(45) Date of Patent: Oct. 22, 2019

(54) SECURITY PATTERN GENERATION METHOD

(71) Applicant: AGFA NV, Mortsel (BE)

(72) Inventor: Rudolf Bartels, Mortsel (BE)

(73) Assignee: AGFA NV, Mortsel (BE)

( * ) Notice: Subject to any disclaimer, the term of this patent is extended or adjusted under 35 U.S.C. 154(b) by 75 days.

(21) Appl. No.: 15/552,315

(22) PCT Filed: Mar. 8, 2016

(86) PCT No.: PCT/EP2016/054898
§ 371 (c)(1),
(2) Date: Aug. 21, 2017

(87) PCT Pub. No.: WO2016/146433
PCT Pub. Date: Sep. 22, 2016

(65) Prior Publication Data
US 2018/0040149 A1  Feb. 8, 2018

(30) Foreign Application Priority Data

Mar. 17, 2015 (EP) ..................... 15159361

(51) Int. Cl.
*G06T 11/40* (2006.01)
*H04N 1/32* (2006.01)
(Continued)

(52) U.S. Cl.
CPC ............ *G06T 11/40* (2013.01); *G06T 3/4038* (2013.01); *G06T 3/60* (2013.01); *G06T 11/203* (2013.01);
(Continued)

(58) Field of Classification Search
CPC ............ G06K 7/1408; G06K 7/10722; G06K 7/1439; G06K 9/00577; G06K 1/121; G06K 9/527; G06K 19/06009; G06K 19/0614; G06K 7/10; G06K 9/00013; G06K 9/00087; G06K 9/4652; G06K 9/52; B41J 3/407; G06T 7/48; G06T 11/203; G06T 11/40; G06T 3/4038; G06T 3/60; H04N 19/99;
(Continued)

(56) References Cited

U.S. PATENT DOCUMENTS 5,772,249 A * 6/1998 Guex ................... B42D 25/342
283/93
6,964,227 B2 * 11/2005 Franz ....................... B41C 1/04
101/150

(Continued)

OTHER PUBLICATIONS

Official Communication issued in International Patent Application No. PCT/EP2016/054898, dated May 23, 2016.

*Primary Examiner* — Abderrahim Merouan
(74) *Attorney, Agent, or Firm* — Keating and Bennett, LLP

(57) ABSTRACT

A security pattern generation method includes generating a plurality of draw instructions to define a plane filling line pattern, wherein the plane filling line pattern includes a repeating sub-pattern that defines a line by a sequence of draw instructions, and searching the sequence of draw instructions in the plurality of draw instructions and, if found, overlaying the searched sequence of draw instructions by a graphic object that is scaled to fit and scaled between the two distinct end points of the line.

13 Claims, 8 Drawing Sheets

(51) Int. Cl.
*G06T 3/40* (2006.01)
*G06T 3/60* (2006.01)
*G06T 11/20* (2006.01)

(52) U.S. Cl.
CPC ..... *H04N 1/32144* (2013.01); *H04N 1/32293* (2013.01)

(58) Field of Classification Search
CPC .. H04N 19/136; H04N 19/44; H04N 1/32144; H04N 1/32293
See application file for complete search history.

(56) References Cited

U.S. PATENT DOCUMENTS

| | | | | |
|---|---|---|---|---|
| 6,975,425 | B1* | 12/2005 | Abe | G06F 17/211 358/1.1 |
| 8,740,076 | B2* | 6/2014 | Anand | G06K 7/10 235/454 |
| 8,982,231 | B2* | 3/2015 | Vincent | B42D 25/351 348/222.1 |
| 2006/0280331 | A1* | 12/2006 | Chosson | G07D 7/20 382/100 |
| 2008/0180751 | A1* | 7/2008 | Simske | B41M 3/14 358/3.28 |
| 2008/0297852 | A1* | 12/2008 | Fan | B42D 25/29 358/3.28 |
| 2009/0097647 | A1 | 4/2009 | Harris | |
| 2013/0002713 | A1* | 1/2013 | Souparis | G07D 7/2033 345/629 |
| 2013/0038942 | A1* | 2/2013 | Holmes | G07D 7/207 359/619 |
| 2013/0088555 | A1* | 4/2013 | Hanina | B41J 3/407 347/107 |
| 2018/0012459 | A1* | 1/2018 | Dragone | G06F 21/86 |

* cited by examiner

SECURITY PATTERN GENERATION METHOD

CROSS REFERENCE TO RELATED APPLICATIONS

This application is a 371 National Stage Application of PCT/EP2016/054898, filed Mar. 8, 2016. This application claims the benefit of European Application No. 15159361.3, filed Mar. 17, 2015, which is incorporated by reference herein in its entirety.

BACKGROUND OF THE INVENTION

1. Field of the Invention

The invention pertains generally in the technical field of security printing for the protection of graphic products from counterfeiting.

2. Description of the Related Art

Security printing is the field of the printing industry that deals with printing of content such as banknotes, passports, tamper-evident labels, product authentication, stock certificates, postage stamps and identity cards. The main goal of security printing is to prevent forgery, tampering, and counterfeiting. Security documents are printed with high resolutions to make copying not feasible.

More recently many of the techniques, used to protect these high-value documents, have become more and more available to commercial printers whether they are using the more traditional offset and flexographic presses or the newer digital platforms, such as inkjet presses with resolution below 5000 dpi. Businesses are protecting their lesser-value documents such as transcripts, coupons and prescription pads by incorporating some of the same features as used in security printing to ensure that they cannot be forged or that alteration of the data cannot occur undetected.

A known technique in security printing is the generation of repeat and/or geometric patterns in a determined space of security document at a high printing resolution, such as the creation of guilloches, which is a repeat pattern. Such repeat patterns, especially when they are rendered in a high printing resolution, are difficult to analyse and to copy and thus ideal to prevent forgery, tampering or counterfeiting. Also the geometric patterns in repeat, also called geometric repeat patterns, are an advantage to secure your documents against forgery.

Examples of guilloches can be found in US20080180751 (HEWLETT PACKARD) wherein variable guilloches with at least two curves are plotted from mathematical equations but clipped in a determined space. Wherein guilloches use more than one curve for generating a curve, space filling curves are generated by one continuous line in a determined space without extending the determined space and without clipping outside this determined space. Such space filling curves are not disclosed in US20080180751 (HEWLETT PACKARD).

The creation of geometric repeat pattern in a determined space of a security document is in the state-of-the-art generated automatically by known computer implemented and mathematical methods. For example the semi-randomized generation of a labyrinth or maze in a rectangular space or irregular shaped space by graph theory based methods are well-known.

Another generation of a geometric repeat pattern is performed by a Lindenmayer system, also called an L-system. More information about Lindenmayer systems is disclosed in electronic version of a book, especially in Chapter 1, that was published by Springer-Verlag, New York, in 1990 an reprinted in 1996: *"The Algorithmic Beauty of Plants"* by Przemyslaw Prusinkiewicz, Aristid Lindenmayer. Examples of such geometric repeat patterns that can be generated by a Lindenmayer system is a Hilbert curve, a Koch curve, Peano Curve and Gosper Curve. Such curves are also called space filling curves or FASS curves, wherein FASS stands for space-Filling, self-Avoiding, Simple, self-Similar. FASS curves where introduced and disclosed in P. Prusinkiewicz, A. Lindenmayer, and F. D. Pracchia. *Synthesis of space-filling curves on the square grid. To appear in Proceedings of FRACTAL '90, the 1st IFIP conference on fractals*, Lisbon, Portugal, Jun. 6-8, 1990. Wherein the self-avoidances was defined as segments of the curve do not touch nor intersect and simplicity was defined as a curve that can be drawn by a single stroke of the pen, without lifting the pen nor drawing any segments more than once. A more recent disclosure of space-filling curves is BADER MICHAEL. Space-Filling Curves: An Introduction With Applications in Scientific Computing. Edited by BARTH T. J., et al. SPRINGER, 2012. p. 278.

The geometric repeat pattern generation methods remain long time secret to the user but the free availability, handbooks, tutorials and open source on/of geometric repeat pattern generators makes the use of such patterns for security documents less suitable to prevent forgery, tampering or counterfeiting. The high resolution rendering and/or printing of such documents makes such geometric repeat patterns still valuable for forgery prevention but there is need to enhance the value of forgery prevention for these patterns and to battle against the counterfeiting business which is growing exponentially.

SUMMARY OF THE INVENTION

In order to overcome the problem described above, preferred embodiments of the present invention has been realised by adapting generated geometric repeat patterns to enhance the prevention of forgery, tampering and counterfeiting which is realised with the present invention, a security pattern generation method, as defined below.

The present invention includes a security pattern generation method by a security pattern generator which executes the following steps:

generating a plurality of draw instructions (100, GENERATE) to define a plane filling line pattern (105) in a determined plane; and wherein the plane filling line pattern (105) comprises a repeating sub-pattern which defines a line, bounded by two distinct end points, by a draw instruction or a sequence of draw instructions; and searching the draw instruction or the sequence of draw instructions in the plurality of draw instructions (300, SEARCH) and, if found, overlaying (400, OVERLAY) the searched draw instruction or searched sequence of draw instructions by a determined graphic object (205, 207) (200, DETERMINE) which is scaled to fit between the two distinct end points of the line and placed between the two distinct end points of the line. By overlaying (400) the sub-pattern with a graphic object (205, 207) the security pattern is difficult to reproduce which serves the pattern to be counterfeiting-save in a security document. By fitting and scaling the graphic object (205, 207) between the two distinct end points, the geometric repeat pattern remains intact and undisturbed by the graphic object (205, 207). The present invention is also a geometric repeat pattern generation method for security printing.

The overlaying step (400) may comprise a replacing step to replace the searched draw instruction or searched sequence of draw instructions by the determined graphic object (205, 207), such as replacing by the set of draw instructions from the determined graphic object (205, 207), if it is a vector graphic, or the overlaying step (400) may comprise an adding step to add the graphic object (205, 207) to the plurality of draw instructions, such as adding the set of draw instructions from the determined graphic object (205, 207) if it is a vector graphic, so the determined graphic object (205, 207) is placed on top of the found repeating sub-pattern. It is more preferred that in the adding step, that the line defined by the repeating sub-pattern is transformed partially or full to a zero thickness line, wherein a partial transformation preferably doesn't transform the line at the distinct end points of the curve. A zero thickness line is a line wherein the line thickness is defined as zero millimeter. The replacing step comprised in the overlaying step (400) is most preferred because the rendering-time shall become less, because zero line thick draw instructions are still be interpreted when rendered.

The overlaying by graphic objects in a plane filling line pattern makes the invention valuable for forgery prevention and for battling against the counterfeiting business which is growing exponentially because it makes it difficult to re-engineer the generated security pattern by criminals.

The method may comprise a step wherein several plane filling line pattern (105) may be selected to enhance security features in the security document. A plane filling line pattern (105) may be selected from a FASS curve, a space-filling curve, a self-similar fractal curve, a de Rham curve, a space-filing tree, a maze, a fret pattern, a kolam pattern, an interlace pattern or a labyrinth. An interlace pattern may be a Celtic knot or an Islamic interlace pattern or a Croatian interlace pattern (FIG. 6, FIG. 7, FIG. 8, FIG. 9, FIG. 10).

A preferred embodiment of the present invention comprises the step of: selecting a Lindenmayer system with an alphabet of vector draw instructions; and wherein the plurality of draw instructions is a plurality of step-by-step vector draw instructions generated by the Lindenmayer system; and wherein the draw instruction is a vector draw instruction of the alphabet or the sequence of draw instructions is a sequence of vector draw instructions from the alphabet. A Lindenmayer system, also called an L-system, is ideal for the generation of geometric repeat patterns, especially plane filling line patterns (105) (FIG. 9, FIG. 10).

In another preferred embodiment the plurality draw instructions is a plurality of straight line draw instructions and wherein the draw instruction is a straight line draw instruction or the sequence of draw instructions is a sequence of straight line draw instructions. Straight line draw instructions are easily to generate, easily to search and a very fast rendering advantage meanwhile the rendering of the security document. In a preferred embodiment only a part of the searched straight line draw instruction or a part of the searched sequence of straight line draw instructions is overlaid. The part that is overlaid is preferably between 20% and 80% of the total length of the searched straight line draw instruction or the total length of the searched sequence of straight line draw instructions. The graphic object (205, 207) in this preferred embodiment is than fitted on the overlaid part of the searched straight line draw instruction or the searched sequence of straight line draw instructions.

In a preferred embodiment the graphic object (205, 207) is rotated to the arctangent between the two distinct end points of the line to prevent a disturbing effect in the geometric repeat pattern, such as a plane filling line pattern.

To prevent a disturbing effect in the geometric repeat pattern, such as a plane filling line pattern, it is preferred that the graphic object (205, 207) is rotated so there is no overlap between the placed graphic object (205, 207) and the plane filling line patterns (105) and/or the graphic object (205, 207) is scaled so there is no overlap between the placed graphic object (205, 207) and the plane filling line pattern.

The searching step (300, SEARCH) may be accompanied with a determined condition (302), such as a condition on the position of searching in the plurality of draw instructions (FIG. 3, FIG. 4, FIG. 5). Other conditions may be checking if the draw instruction or sequence of draw instructions is found, and only overlaying what the previous draw instruction or next draw instruction is. These conditions are kept preferably secret which makes it difficult to counterfeit or reproducing by fraud a secret document. In a preferred embodiment the searching step (300, SEARCH) is a searching step under a determined condition (302). The overlaying by graphic objects in a plane filling line pattern by such conditions, as secret key, makes the invention valuable for forgery prevention and for battling against the counterfeiting business which is growing exponentially because it makes it difficult to re-engineer the generated security pattern by criminals.

Especially when the determined condition is based on the counting number of the founded searches, the overlaying generates from the space filling line pattern a new space filling line pattern which still remains a geometric repeat pattern. So in a more preferred embodiment comprises the step of overlaying (400) the draw instruction or the sequence of draw instructions by searching (302) from start or a determined start position until end or a determined end position in the plurality of draw instructions every $N^{th}$ time the draw instruction or the sequence of draw instructions is found by the determined graphic object (205, 207), after scaling and wherein N is more than one (FIG. 3, FIG. 4, FIG. 5).

The reproducing by fraud may be become even more difficult when another graphic object (205, 207) is also overlaying (400) the same or another draw instruction or the same sequence of draw instruction or another sequence of draw instructions. so a preferred embodiment may comprises the step:

determining an other graphic object (205, 207); and overlaying by searching (300, SEARCH) from start or another determined start position until end or another determined end position in the plurality of draw instructions every $M^{th}$ time the draw instruction or the sequence of draw is found by the determined other graphic object (205, 207) and wherein M is more than one and not equal to N. Or another preferred embodiment wherein the plane filling line patterns (105) comprises an other repeating sub-pattern which defines an other line, bounded by two distinct end points, by an other draw instruction or an other sequence of draw instructions comprises the steps of searching (300, SEARCH) the other draw instruction or other sequence of draw instructions in the plurality of draw instructions and, if found, overlaying the searched other draw instruction or other sequence of draw instructions by the other determined graphic object (205, 207) which is scaled to fit between the two distinct end points of the other line and placed between the two distinct end points of the other line (FIG. 5).

In a preferred embodiment the determined graphic object (205, 207) is equal to the repeating sub-pattern but with another line-thickness and/or another colour and/or another dashed line characteristic so the geometric repeat pattern, such as a plane filling line pattern, remains the characteristic of a geometric repeat pattern but with enhanced counterfeiting safety.

Figure 1:
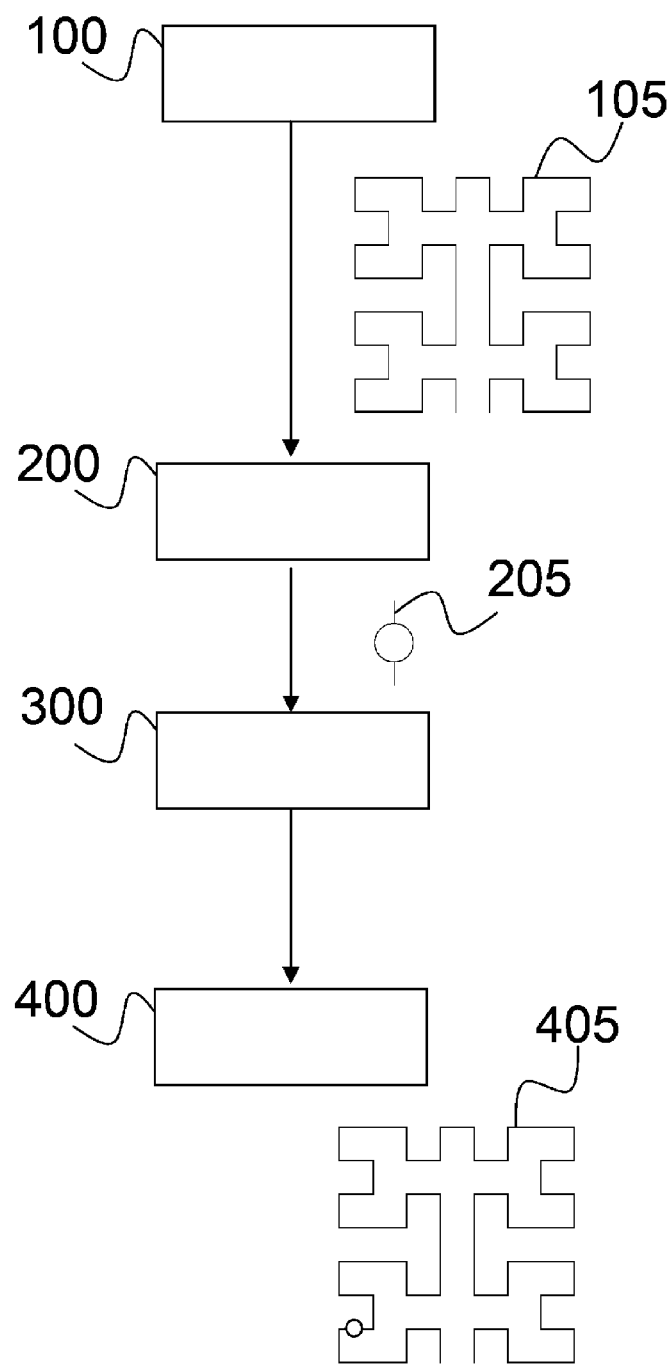
FIG. 1 represents a flow chart according to a preferred embodiment of the present invention. The present invention includes a security pattern generation method by a security pattern generator by executing the following steps.

generating (100, GENERATE) a plurality of draw instructions to define a plane filling line pattern (105); and wherein the plane filling line pattern comprises a repeating sub-pattern, inhere a straight line;

determining (200, DETERMINE) a graphic object (205);
searching the repeating sub-pattern (300, SEARCH);
overlaying the repeating sub-pattern (400, OVERLAY) by the determined graphic object (205) which is scaled to fit between the two distinct end points of the straight line of the repeating sub-pattern and placed between the two distinct end points of the straight line, which results in a new security pattern (405). The generated plane filling line pattern (105) is in this figure a space filling curve.

Figure 2:
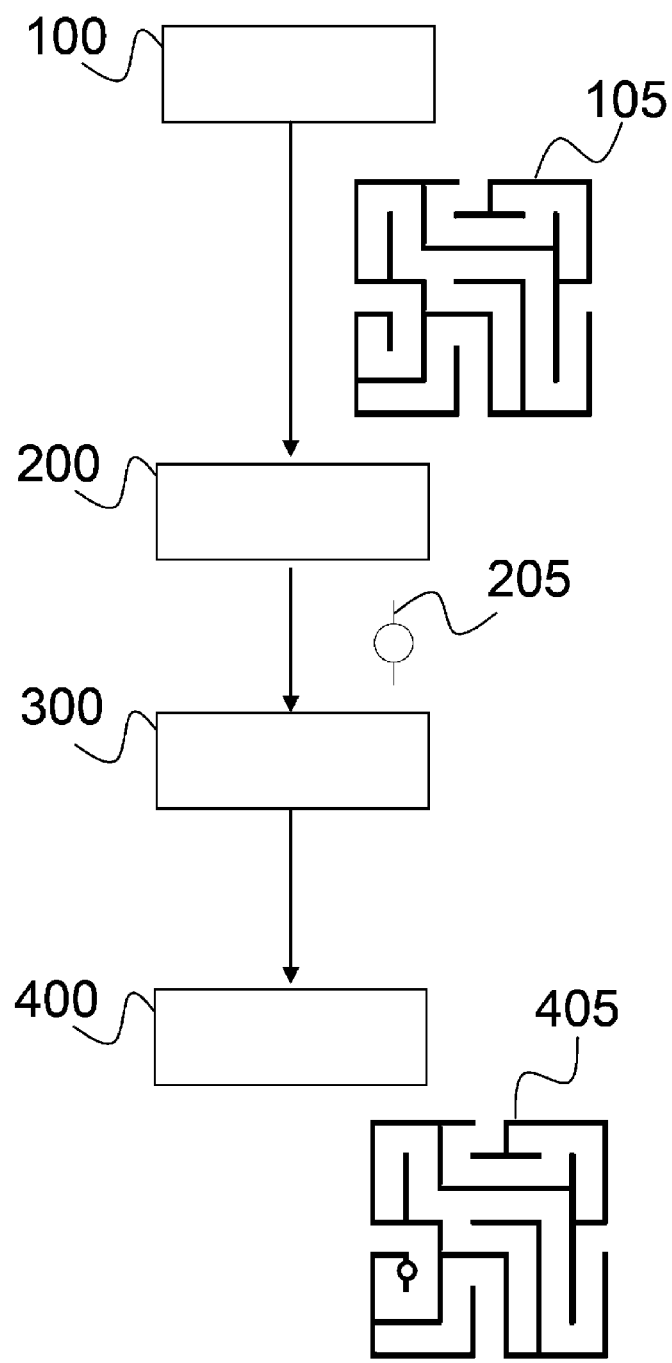

FIG. 2 is also a flow chart as in FIG. 1 wherein the generated plane filling line pattern (105) (105) is a maze and the repeating sub-pattern is a straight line.

Figure 3:
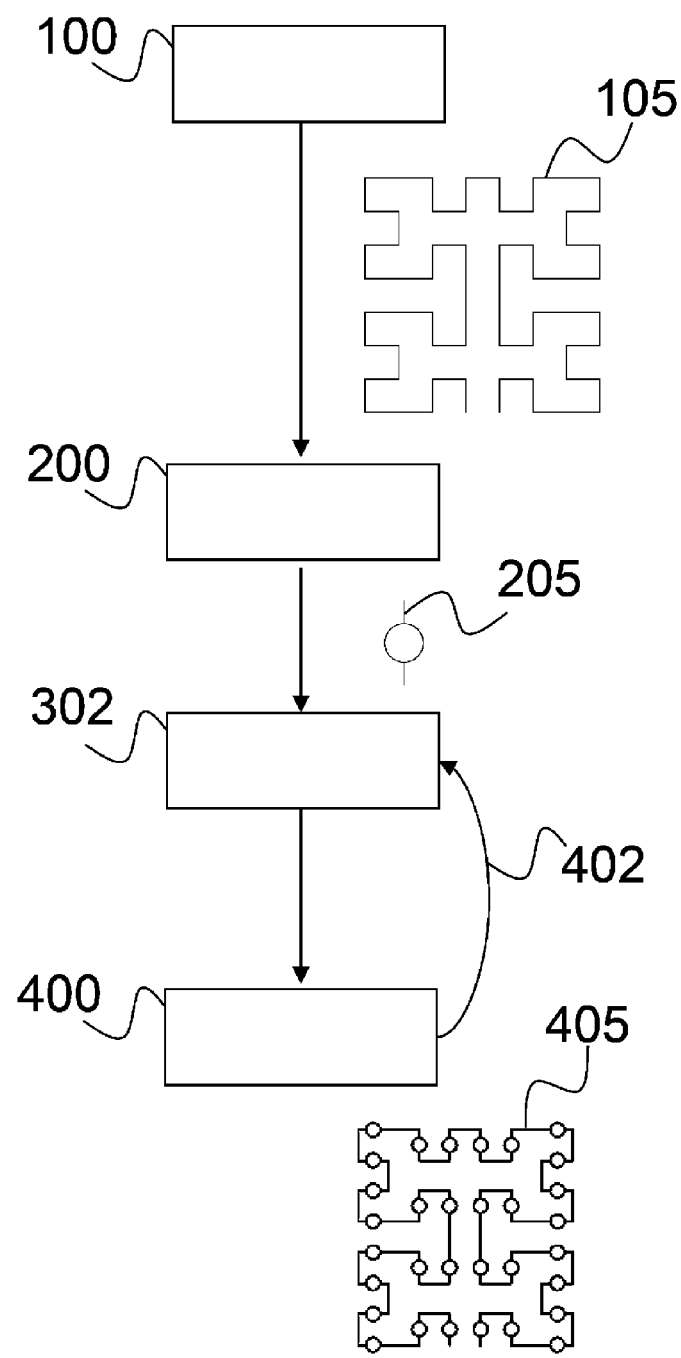

FIG. 3 is also a flow chart as in FIG. 1 with a space filling curve as generated plane filling line pattern (105) (105) and the repeating sub-pattern is a straight line but wherein each $2^{nd}$ time the repeating sub-pattern is found, the repeating sub-pattern is overlaid (400) by the graphic object (205) by repeating (402) a conditional search (302).

Figure 4:
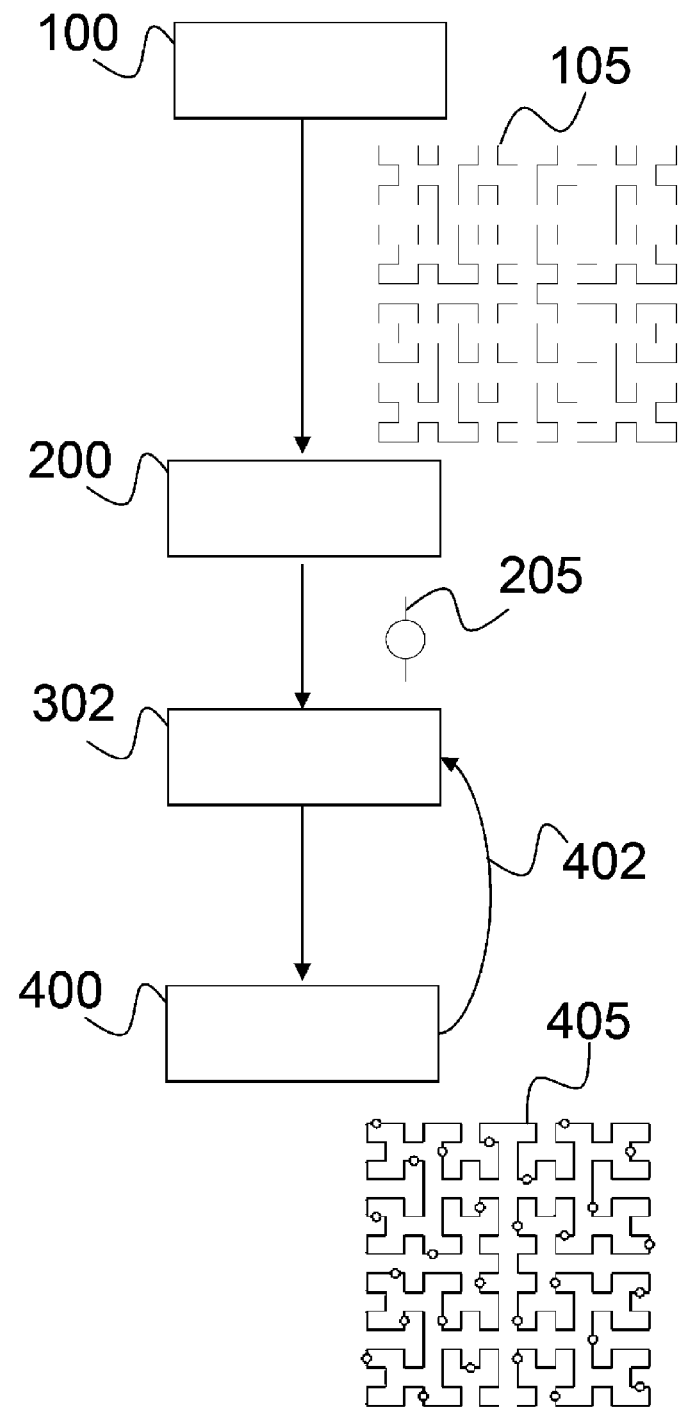

FIG. 4 is also a flow chart as in FIG. 3 with a larger space filling curve as generated plane filling line pattern (105) (105). The repeating sub-pattern is a straight line but wherein the graphic object (205) but each 9th time the repeating sub-pattern is found by repeating (402) a conditional search (302) which started from 8th found repeating sub-pattern, the repeating sub-pattern is overlaid (400) by the graphic object (205).

Figure 5:
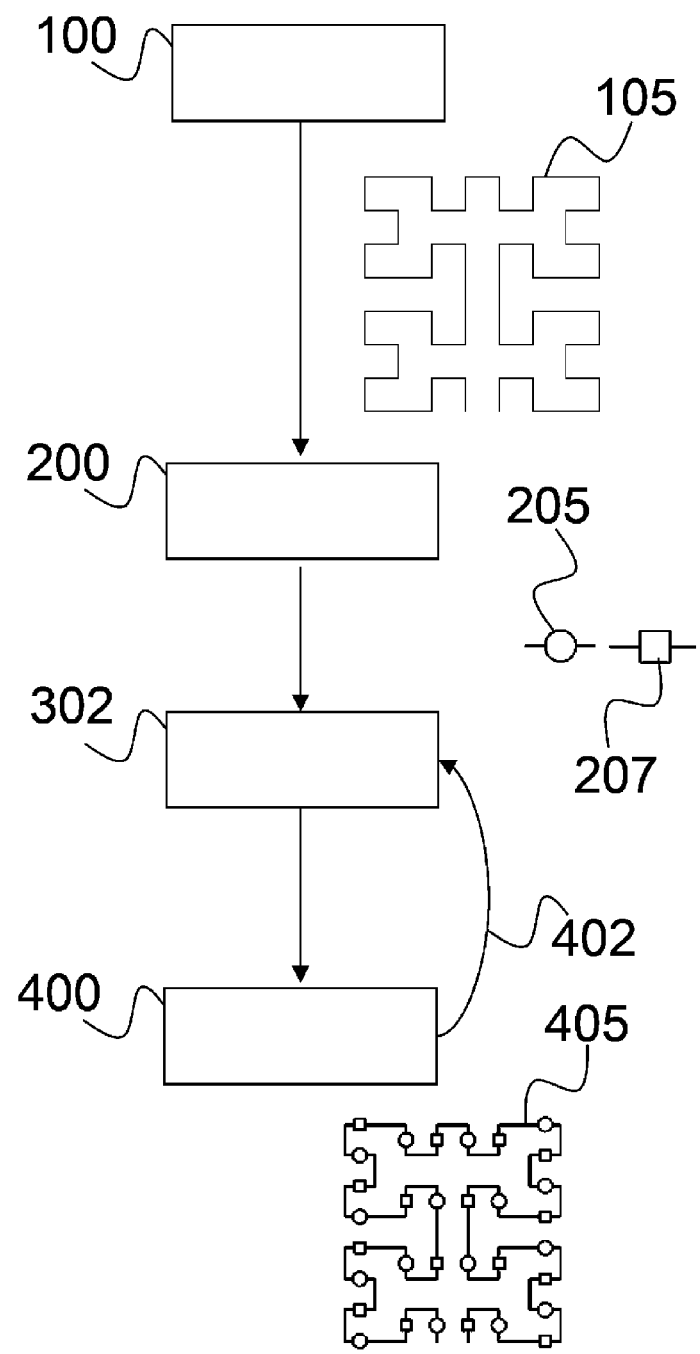

FIG. 5 is also a flow chart as in FIG. 3 with a space filling curve as generated plane filling line pattern (105) (105). The repeating sub-pattern is a straight line but wherein the repeating sub-pattern is overlaid by one of the both graphic objects (205, 207). The repeating sub-pattern is replaced by the first graphic object (205) each $4^{th}$ time and the other graphic object (207) is replaced $4^{th}$ time is found by repeating (402) a conditional search (302) which started from the $1^{st}$ found repeating sub-pattern for the first graphic object (205) and which started from the $3^{rd}$ found repeating sub-pattern for the other graphic object (207).

Figure 6:
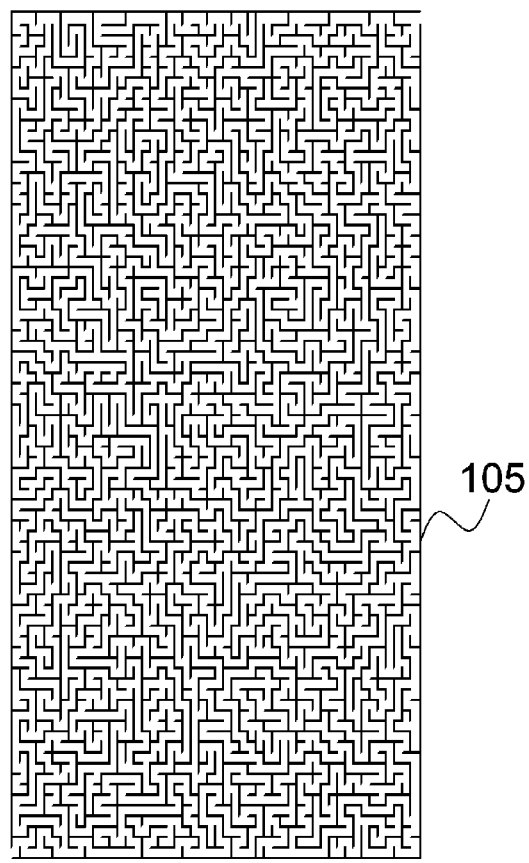
Figure 8:
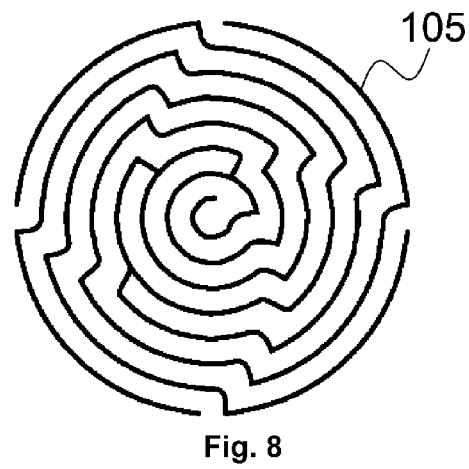

FIG. 6 and FIG. 8 each illustrate a generated plane filling line pattern (105) (105), especially a maze as plane filling line pattern.

Figure 7:
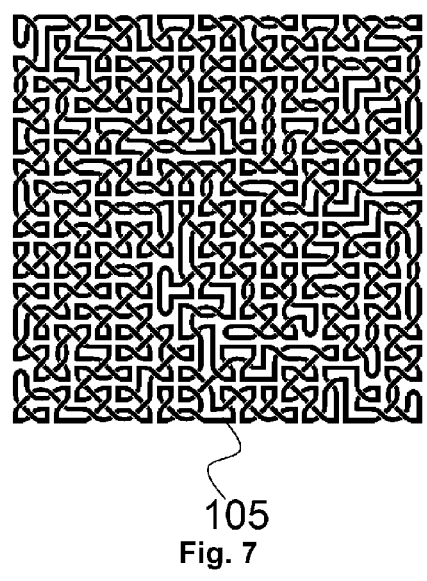

FIG. 7 illustrates a generated plane filling ling pattern (105), especially a Celtic knot as plane filling line pattern.

Figure 9:
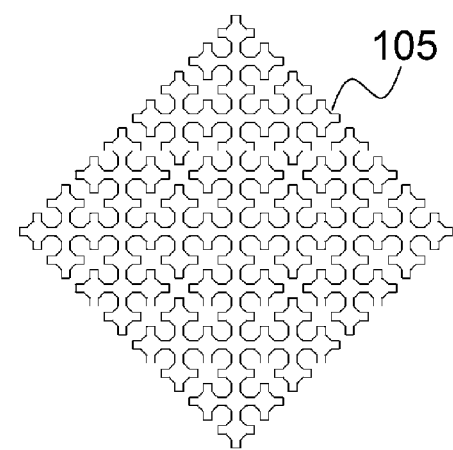
Figure 10:
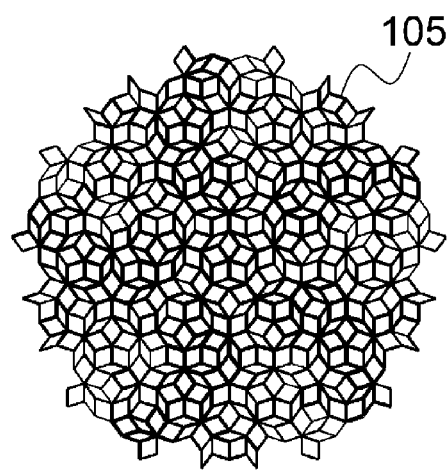

FIG. 9 and FIG. 10 each illustrate a generated plane filling line pattern (105) (105). Both figures are generated by an L-system.

Figure 11:
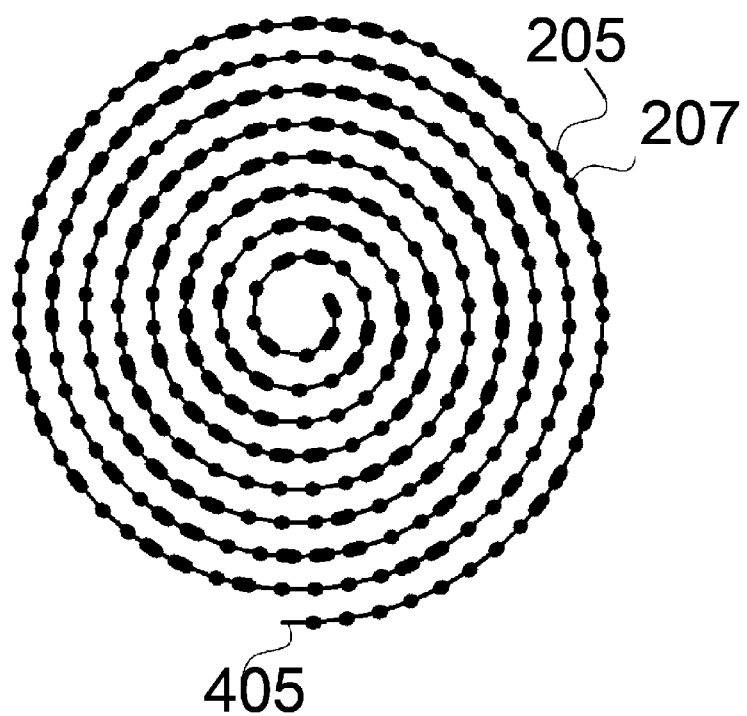

FIG. 11 illustrates a result wherein a repeating sub-pattern, an arc, is replaced with 2 graphic object (205, 207). The generated plane filling curve pattern (105) is in here a space filling curve for a circle: a spiral. The graphic objects on the generated plane filling curve pattern (105) forms an identification code which can be read by a digital imaging device wherein the space filling curve is followed and the thickness and length of both graphic objects (205, 207) is interpreted to decoding the embedded identification code.

The generated plane filling curve patterns (105) in all these drawings (FIG. 1, FIG. 2, FIG. 3, FIG. 4, FIG. 5, FIG. 6, FIG. 7, FIG. 8, FIG. 9, FIG. 10, FIG. 11) are ordinary examples, which are only for illustration purposes. The generation of real security patterns have a much higher resolution and larger repeat wherein for example the spaces between the lines of the plane filling curve pattern is too small to be added in a patent description for acceptance by patent receiving offices.

DETAILED DESCRIPTION OF THE PREFERRED EMBODIMENTS

Plane Filling Line Pattern

To prevent counterfeiting, geometric repeat patterns are filled in a region, mostly filled as background pattern, of the document space from the security document. The complexity of such geometric repeat patterns is hard to reproduce and thus serve as a security feature. Such geometric repeat patterns which are filling a region are called a plane filling line pattern (FIG. 6, FIG. 7, FIG. 8, FIG. 9, FIG. 10, 105).

In a preferred embodiment a plane filling line patterns (105) is rendered, while printing the security document at a minimum print resolution of 4800 dots per inch, more preferable at a minimum print resolution of 9600 dots per inch. The present invention preferably includes a printing method by a content output device, wherein the security document is rendered between 2400 dots per inch and 19200 dots per inch. A content output device is a device which reproduces the content data of a document in its document space such as a display device, projector device or printer device.

A plane filling line pattern, which is determined by one or more lines, is a geometric repeat pattern that may fill a region, also called a space, in the document space of a document. This region can be any shape but it is totally filled with the plane filling line pattern. Preferably this region is rectangular shaped. The lines or parts of lines, in a plane filling line patterns (105) may have any colour, thickness or may be defined as a dashed line. Preferably a plane filling line patterns (105) is a single line which fills the region.

In a preferred embodiment of the present invention the plane filling line patterns (105) is a space-filling curve or a FASS curve, a space-filling curve, a self-similar fractal curve, a de Rham curve, a space-filing tree, a maze, a fret pattern, a kolam pattern, interlace pattern, or a labyrinth. In the present invention the plane filling line patterns (105) has the constraint to comprise a repeating sub-pattern that defines a line, bounded by two distinct end points and preferably the plane filling line pattern, itself, is a line, bounded by two distinct end points.

Interlace patterns are a kind of design, historically used as a decorations in many places and by different cultures, such as everlasting knots, Celtic knots or Islamic interlace pattern or Croatian interlace patterns. Interlace patterns are mostly looped, braided and/or knotted.

In the state-of-the-art a plane filling line patterns (105) is generated by a plane filling line pattern generator wherein these geometric repeat pattern, also called a periodic pattern, are generated by software methods which often comprises mathematical methods. In a preferred embodiment the plane filling line pattern generator is a Lindenmayer-system.

In the present invention the plane filling line patterns (105) is generated and determined as a plurality of draw instructions. A draw instruction is an instruction to draw an image in a document space. The image is often a geometrical primitive such as a point, line, arc, polygon. A draw instruction may be a vector draw instruction or a straight line draw instruction. The generated plurality of draw instructions may comprise also other instructions such as jump to absolute or relative positions in the document space, storing positions, direction of drawing, defined as an angle . . . .

Some examples of computer generated geometric repeat patterns are Taprats™ (http://sourceforge.net/projects/taprats) for Islamic interlacing pattern, Knotter™ (http://sourceforge.net/projects/knotter) for Celtic Knots, Amaze™ (http://sourceforge.net/projects/qtamaze) for maze generation. A Kolam pattern generator is disclosed in ROBINSON THAMBURAJ. Extended Pasting Scheme for Kolam Pattern Generation. *FORMA*. 2007, vol. 22, p. 55-64.

The generated plane filling line pattern (105) after the overlaying (400) may be clipped and/or scaled to a determined region from the document space of the security document. The determined region may be any shape.

The lines in a plane filling line patterns (105) and the lines in the determined graphic object (205, 207) have preferably a thickness between 1 μm and 10 mm. Smaller the thickness of these lines more difficult to counterfeit the security document.

The minimum distances between the lines in a plane filling line patterns (105) is preferably between 1 μm and 10 mm. Smaller the minimum distances between the lines, more difficult to counterfeit the security document.

The spaces between the lines in a plane filling line patterns (105) and the lines in the determined graphic object in the present invention are preferably between 1 μm and 10 mm. Smaller the spaces between the lines, more difficult to counterfeit the security document.

Content Output Devices

More and more content output devices, such as display devices, projector devices and printer devices, are developed for the reproduction of content such as images and text. Examples of content output devices that are used to reproduce a document are CRT's, LCD's, plasma display panels (PDP), electroluminescent displays (ELD), carbon nanotubes, quantum dot displays, laser TV's, Electronic paper, E ink, projection displays, conventional photography, electrophotography, dot matrix printers, thermal transfer printers, dye sublimation printers and inkjet systems to name a few. Also the conventional printing systems such as offset printing, lithography, rotogravure, flexography, letterpress printing, and screen-printing are developed for the reproduction of images and/or text and are thus also content output devices.

An apparent output resolution of a content output device refers to the fact that the human eye perceives an image as having greater detail than it does in physical reality, which is defined by the true output resolution. The apparent and the true output resolutions are defined in dots per inch (dpi), especially for printer devices and defined in pixels per inch (ppi), especially for display devices and also called pixel density. One inch is exactly 25.4 millimeter.

In a preferred embodiment the security document is reproduced a content output device with a true output resolution more than 2400 dots per inch and in a more preferred embodiment the security document is reproduced by a content output device with a true output resolution more than 4800 dots per inch (dpi) and in a most preferred embodiment the security document is reproduced by a content output device with a true output resolution more than 9000 dots per inch (dpi).

Larger the true output resolution and the apparent output resolution of a content output device, finer the plane filling line pattern; which makes the reproduction of the security document and counterfeiting harder to achieve.

Rotogravure (roto or gravure for short) is a type of intaglio printing process, which involves engraving the image onto an image carrier. In gravure printing, the image is engraved onto a cylinder because, like offset printing and flexography, it uses a rotary printing press. Rotogravure process by a gravure printer is still used for commercial printing of magazines, postcards, and corrugated (cardboard) product packaging and the manufacturing of decorative workpieces.

Offset printing, which is an example of a conventional printing system, is a printing technique in which ink is spread on a metal plate with etched images, then transferred (offset) to an intermediary rubber blanket and finally to the printing surface by pressing the paper to the blanket. When printing colour images, four plates are normally used, one for each CMYK component. Additionally, spot colours can be added by adding a new layer with the specific pigment needed.

Nowadays modern offset systems use computer to plate technology, which create plates directly from the computer output, contrary to the older technology where photographic films were created by computers and then used for creating the plate. Offset presses are big, expensive and complex devices which require experienced operators to run them. The process of preparing a document to be printed in an offset press is complicated, since plates have to be created and the operators have to spend some time manually preparing and calibrating the offset press to get the desired result. Even though this process is rather expensive and slow, the actual printing process is cheap, fast and produces high image quality. This makes it a good solution for producing large amounts of copies. For this reason, it has become the most popular way of commercial printing and it is largely used for printing newspapers, magazines, books, etc.

In an inkjet system, which is an example of a digital printing system, the ink is directly deposited, also called jetted, onto a substrate, simplifying the printing mechanism and eliminating all the process of creating plates. Besides, it avoids the extra job that offset operators need to do in order to get the offset press ready for printing. Both things lead to a shorter turnaround time, cheaper starting point for a single copy and copies customization which is not possible in offset since it is unviable to create a different plate for each copy.

In another preferred embodiment the security document is reproduced by a micro-lithography device or by a nano-lithography device. Micro-lithography and nano-lithography refer specifically to lithographic patterning methods capable of structuring material on a fine scale. Typically, features smaller than 10 micrometers are considered micro-lithographic, and features smaller than 100 nanometers are considered nano-lithographic. Photolithography is one of these two methods, micro- and nano-lithography, often applied to semiconductor manufacturing of microchips. Photolithography is also commonly used for fabricating Microelectromechanical systems (MEMS) devices. Photolithography generally uses a pre-fabricated photomask or reticle as a master from which the final pattern is derived. Although photolithographic technology is the most commercially advanced form of nanolithography, other techniques are also used for example electron beam lithography is capable of much true output resolutions (sometimes as small as a few nanometers).

An embodiment of the present invention includes a printing method for printing a security document wherein the security document comprises a plane filing line pattern achieved by the generation method of the present invention. Or an embodiment of the present invention is a rendering method for rendering a security document on a content output device wherein the security document comprises a plane filing line pattern achieved by the generation method of the present invention.

Searching & Overlaying

In a preferred embodiment of the present invention the searching step (300, SEARCH) is a pattern matching method and preferably comprises a string searching algorithm to find a draw instruction or a sequence of draw instructions in the generated plurality of draw instructions such as Boyer-Moore string search algorithm or Rabin-Karp string search algorithm.

The searching method (300) may start not on the first draw instruction of the plurality of draw instructions but also at a determined start position. And/or the searching method may end not on the last draw instruction of the plurality of draw instructions but also end at a determined end position. Normally the searching method is a forward searching method but it may also be backward searching method.

Except for searching a match of the sub-pattern in the present invention, the searching method (300) may comprise a determined condition such as searching the $N^{th}$ match in the plurality of draw instructions wherein N is determined as a non-zero number, but the condition may also depending on the position of searching in the plurality of draw instructions, such as only searching when the position in the plurality o draw instructions is odd or a plurality of M.

The sub-pattern in the present invention may be overlaid 1 time but preferably all founded sub-patterns, from start until end in the plurality of draw instructions under the determined condition and more preferably all founded sub-patterns from a start position or determined start position until a determined end position or end in the plurality of draw instruction, are overlaid.

The overlaying step (400) may comprise a string replacing method in a string which is disclosed in several in a variety of computer languages.

Line

For the sake of clarity, it should be clear that a line is a two-dimensional continuous line which doesn't have to be straight. A line has a start point and an end point, which are called the two end-points of the line. The start point and the end point are in the present invention not the same. The length of the line is finite and bounded. A line is in preferred embodiment uninterrupted.

The angle of a line is defined by determining arctangent from the two end-points of the line. In a variety of computer languages and vector graphic formats, the arctangent is the function a tan 2 with two arguments to return the appropriate quadrant of the computed angle between the two end-points of the line.

Lindenmayer System

A Lindenmayer system, also called an L-system, is a parallel rewriting system and a type of formal grammar. An L-system consists of an alphabet of symbols that can be used to make strings, a collection of production rules that expand each symbol into some larger string of symbols, an initial "axiom" string from which to begin construction, and a mechanism for translating the generated strings into geometric structures. The symbols of the alphabet are preferably vector draw instructions, such as Turtle Graphics and the string generated from the Lindenmayer system is than a plurality of step-by-step vector draw instructions.

L-systems are disclosed in an electronic version of a book, especially in Chapter 1, that was published by Springer-Verlag, New York, in 1990 an reprinted in 1996: "*The Algorithmic Beauty of Plants*" by Przemyslaw Prusinkiewicz, Aristid Lindenmayer.

A pattern generated by an L-system is an advantage to be used as security enabled graphic object in a security document to prevent for example counterfeiting. Because the security pattern is defined by determined production rules and determined alphabet, which are difficult to re-engineer on the security pattern itself.

The recursive nature of the L-system rules leads to self-similarity and thereby, fractal-like forms are easy to describe with an L-system, such as a Hilbert curve or Sierpinski Triangle.

In a preferred embodiment the L-system generates a space-filling curve. Space filling curves are disclosed in is BADER MICHAEL. Space-Filling Curves: An Introduction With Applications in Scientific Computing. Edited by BARTH T. J., et al. SPRINGER, 2012. p. 278. In a preferred embodiment the L-system generates a space filling curve selected from Hilbert curve, Lévy C curve, Koch curve, Peano curve, Gosper curve, Dragon curve, Moore curve. (FIG. 9, FIG. 10)

Document

A document comprises content, preferably graphically arranged, also called assembled, in a document space. A document is digital stored in a storage unit such as hard disk drive (HDD) connected to a hardware configuration such as a computer, memory in a central processing unit (CPU) comprised in a hardware configuration and the like. The graphically arrangement, also called lay-outing, of the content in the document space is also called the lay-out of the document.

A document may comprise a static layout or preferably a dynamic layout. Static layout design may involve more graphic design and visual art skills; whereas dynamic layout design may involve more interactive design and content management skills to thoroughly anticipate content variation.

The document space of the document may be a two-dimensional space with two fixed dimensions, more preferably the document space is a page or multiple pages and most preferably a web-page.

The document space may be a two-dimensional space with one fixed and one endless dimension such as in the rendering method of multiple print jobs disclosed in EP 1933257 (Agfa Graphics NV).

A raster graphic is also known as a bitmap, contone or a bitmapped graphic and represent a two-dimensional discrete image P(x,y).

A vector graphic, also known as object-oriented graphic, uses geometrical primitives such as points, lines, curves, and shapes or polygon(s), which are all based on mathematical expressions, to represent an image. A vector graphic may be a turtle graphic which uses a relative cursor (the "turtle") upon a Cartesian plane. Turtle graphics is a key feature of the Logo programming language. A vector graphic is thus a set of draw instructions. A vector graphic is in the present invention a two-dimensional vector graphic.

A content object is a raster or vector graphic which defines certain content in a bounded shape. The minimum rectangular around the bounded shape is called bounding box of a content object. A document comprises one or more layouted content object. A content object in a document may be defined in a vector graphics format, also called line-work format, such as Logo, Scale Vector Graphics (SVG) or AutoCad Drawing Exchange Format (DXF) and more preferably defined in a page description language (PDL) such as Printer Command Language (PCL): developed by Hewlett Packard, Postscript (PS), Encapsuled Postscript (EPS): developed by Adobe Systems or Portable Document Format (PDF): developed by Adobe Systems. A content object is also called a graphic object. Preferably the graphic object (205, 207) which is placed between the two distinct end points of the line in the present invention is a vector graphic.

Preferably the lay-out of the document is created in a desktop publishing (DTP) software package such as Adobe InDesign™, Adobe PageMaker™, QuarkXpress™ or Scribus (http://scribus.net/canvas/Scribus).

The content objects in a document may be defined in a document markup language, also called mark-up language, such as IBM's Generalized Markup Language (GML) or Standard Generalized Markup Language (ISO 8879:1986 SGML), more preferably defined in HyperText Markup Language (HTML) and most preferably defined in HTML5, the fifth revision of the HTML standard (created in 1990 and standardized as HTML 4 as of 1997) and, as of December 2012, is a candidate recommendation of the World Wide Web Consortium (W3C). Such a document is sometimes called a web-document.

The layout of a web-document may be created in a web-design software package by Cascading Style Sheets (CSS), a style sheet language used for describing the content of the document in the document markup language and more preferably the layout of a web-document is created in a web-design software package by Cascading Style Sheets 3 (CSS3), published from the CSS Working Group of the World Wide Web Consortium (W3C).

The content objects in a document may be defined in a Variable Data Printing format (VDP) such as Intelligent Printer Data Streams (IPDS): found in the AS400 and IBM mainframe environments and used with dot matrix printers, Variable data Intelligent PostScript Printware (VIPP): A proprietary VDP language from Xerox, traditionally used in the transactional black-and-white printing market, Variable Print Specification (VPS): a VDP language from Creo, Advanced Function Presentation (AFP) format defined by AFP Consortium (AFPC), more preferably defined in Personalized Print Markup Language (PPML), an XML-based industry standard printer language for variable data printing defined by Printing On Demand Initiative (PODi) and most preferably defined in PDF/VT published in 2010 as ISO 16612-2.

In a preferred embodiment a document is defined in a document format selected from vector graphic formats, document markup language or variable data printing format, more preferably selected from page description formats, variable data printing format or document markup language and most preferably selected from Portable Document Format (PDF) or the fifth revision of HyperText Markup Language (HTML5).

A Security Document

A security document is a document which comprises one or more content objects to prevent copying, forgery, tampering and to battle against counterfeiting and to protect a brand of brand owners.

Examples of security documents are tax labels, lottery tickets, event tickets, design vouchers, identity cards, banknotes, legal documents and official documents, certificates, passports, identity documents, driver's licenses or packages for luxury or pharmaceutical products.

Examples of content objects, as security feature to prevent copying, forgery and/or tampering are guilloches, antiphotocopy patters, latent image designs, security screening, repeat patterns, such as guilloches, and geometric repeat patterns, such as space filling curves. Such content objects are called security enabled content objects.

A security document is preferably layouted in a digital assembly system, such as a desktop publishing (DTP) software package or a web-design software package. Such system comprises than a graphic base editor wherein security enabled content objects can be added in a document. It has preferably a modular approach to add one or more security features in the security document. The digital assembly system replaces the old labour intensive, mechanical pattern generation devices. The digital assembly system goes fare beyond the limitations imposed by these mechanical pattern generation devices. The easy calculation and combination of a lot of parameters makes life of the designer of the security document easy and enables him to implement more security in the same amount of time.

Examples of such digital assembly system for security printing are: Fortuna™ by Agfa Graphics and high security design software of JURA™, a Hungarian company (www.jura.hu).

The hardware configuration (HW) that may perform the present invention as a computer implemented method is a computer, tablet computer and the like, comprising a central processing unit (CPU), a memory, a storage device such as a hard disk drive (HDD), a communication interface (IF) device that sends and receives data to and from other hardware configurations via a network. In a preferred embodiment the present invention is performed by one or more GPU's.

The hardware configuration may comprise a user interface (UI) device that may comprise a display device, which gives a result of the pattern generation method. The rendering of the pattern to the user interface (UI) device is performed by a raster image processing method in a raster image processor (RIP).

Graphic Processing Unit

Graphic Processing Units (GPU's) have been used to render computer graphics for years. Nowadays they are also used for general-purpose tasks due to their highly parallel structure, making them more efficient than Central Processing Units (CPU's).

GPU's can be combined with CPU's to achieve greater performance. In this way, serial parts of the code would run on the CPU and parallel parts would do it on the GPU. While CPU's with multiple cores are available for every new computer and allow the use of parallel computing, these are focused on having a few high performance cores. On the other hand, GPU's have an architecture consisting of thousands of lower performance cores making them especially useful when large amount of data have to be processed.

One of the most popular tools available on the market of GPU computing is CUDA. CUDA is a parallel computing platform and programming model created by Nvidia™ and available only for their GPU's. The main advantage of CUDA is its ease of use, using the language known as CUDA C which is essentially an extension of C, with similar syntax and very easy to integrate in a C/C++ environment.

The needed data is first copied from the main memory to the GPU memory (①), the CPU sends an instruction to the GPU (②), the GPU executes the instruction in all the parallel cores at the same time (③), and the result is copied back from the GPU memory to the main memory (④).

CUDA parallel execution units consist of threads grouped into blocks. Combining the use of blocks and threads the maximum number of available parallel units can be launched, which for the latest GPU's can be more than 50 million. Even though this is a great amount of parallel capability, there are some cases where data might exceed the limit. In those cases, the only possibility is to iterate through the grid of millions of parallel units as many times as needed till all the data is processed.

Raster Image Processing Method

A raster image processing method is an image manipulation method that interpret a document to render the interpretation of the document to:

a raster graphic which is suitable for viewing on a display device such as a television, computer monitors or the display device of a tablet computer or mobile phone; or a raster graphic which is suitable for projecting the raster graphic by a projector device such as a video-projector, LCD projector, DLP projector LED projector or laser diode projector; or a raster graphic which is suitable for printing on a printer device such as a toner-based printer, an inkjet printer or offset press.

A content output device is a device which reproduces the content data of a document in its document space such as a display device, projector device or printer device.

A raster image method is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise a user interface (UI) device that may comprise a display device.

The apparatus that performs a raster image processing method is called a raster image processor (RIP). A raster image processor (RIP) may comprise a prepress workflow system such as Prinect Workflow System™ from Heidelberger Druckmaschinen AG or Apogee Prepress™ from Agfa Graphics NV or the prepress workflow system disclosed in US20130194598 (FUJI XEROX).

In a preferred embodiment a raster image processor comprises one or more GPU's for faster rendering a document to a content output device.

Other Preferred Embodiments

The placed determined graphic object (205, 207) in the present invention may inherit the line thickness, colour and/or dashed line characteristics of the search draw instruction or searched sequence of draw instructions so the line thickness, colour and/or dashed line characteristics of the plane filling pattern is similar as the generated plane filling line pattern (105).

The placed determined graphic object (205, 207) may be equal to the repeating sub-pattern but the thickness, colour and/or dashed line characteristics may be different as the repeating sub-pattern. Preferably the placed graphic object (205, 207) is not the repeating sub-pattern.

The rotation and/or scaling of the determined graphic object (205, 207) in the present invention is preferably comprising the calculation of the bounding box of the determined graphic object (205, 207) but it can be using other methods such as a shape detection method on the determined graphic object (205, 207).

The determined graphic object (205, 207) may be triangular, quadratic, rectangular, heptagonal, pentagonal, oval, rhombus, octagonal, or elliptical shaped.

The determined graphic object (205, 207) may be a result of a generation from an L-system (a recursive plane filling line pattern), a logo or guilloches to make the counterfeiting more difficult. A logo is a graphic mark or emblem commonly used by commercial enterprises, organizations and even individuals to aid and promote instant public recognition. Logos are either purely graphic (symbols/icons) or are composed of the name of the organization (a logotype or wordmark).

The determined graphic object (205, 207) may be a FASS curve, a space-filling curve, a self-similar fractal curve, a de Rham curve, a space-filing tree, a maze, a fret pattern, a kolam pattern, an interlace pattern or a labyrinth. The geometric repeat is important for the protection of graphic products against counterfeiting. Using a graphic object (205, 207) which itself is a geometric repeat pattern makes the pattern more valuable of forgery prevention.

The method may comprise a method to embed a plurality of N-bit data wherein each possible value of N-bit data has a thickness ($T_{N,i}$) and length ($L_{N,i}$); and wherein the plurality of N-bit data comprises a first N-bit data ($N_1$), subsequent by a different second N-bit data ($N_2$) on a curve of the plane filling line pattern; and wherein the thickness ($T_{N,i,1}$) of the value ($v_{N,1}$) of the first N-bit data ($N_1$) on the curve is different from the thickness ($T_{N,i,2}$) of the value ($v_{N,2}$) of the second N-bit data ($N_2$) and/or wherein the length ($L_{N,i,1}$) of the value ($v_{N,1}$) of the first N-bit data ($N_1$) on the curve is different from the length ($L_{N,i,2}$) of the value ($v_{N,2}$) of the second N-bit data ($N_2$) so the plane filling line pattern is also an identification code, especially an optical machine-readable reproduction which is scanned by special optical scanner or digital imaging devices to decode the plurality of N-bit date, which is embedded in the plane filling line pattern. In a preferred embodiment the thickness in the curve is than formed by the determined graphic object (205, 207). The plane filling line pattern is than a plane filling line pattern with embedded identification code.

The present invention is also an identification decoding method wherein the plane filling line pattern with embedded identification code is decoded by an identification decoding method which comprises the following steps:

capturing a plane filling line pattern with embedded identification code by a digital imaging device; and determining an image captured curve in the image captured plane filling line pattern with embedded identification code; and determining a set of two-dimensional points ($p_k$) on the image captured curve a set of thicknesses ($t_k$) of the image captured curve; and determining the plurality of N-bit data from the set of thicknesses ($t_k$) and the location of the set of two-dimensional points ($p_k$) on the image captured curve;

wherein the thicknesses is formed by the determined graphic object (205, 207).

The present invention is also an identification encoding method wherein the plane filling line pattern with embedded identification code is encoded by an identification encoding method which comprises the following steps:

determining a document; and determining a curve in the document; and determining for an N-bit data of the plurality of N-bit data a thickness ($T_{N,i}$) and a length ($L_{N,i}$); and determining a first segment on the determined curve with determined length ($L_{N,i}$); and changing the thickness of a part in the first segment to the determined thickness ($T_{N,i}$); and generating from the document with the generated plane filling line pattern (105) with embedded identification code a new document; wherein the thickness is formed by the determined graphic object (205, 207).

In a preferred embodiment the identification encoding method may comprise the following steps:

determining the following N-bit data of the N-bit data a thickness ($T_{N,i}$) and a length ($L_{N,i}$); and determining a second segment on the determined curve, following the first segment, wherein the second segment has the determined length of the following N-bit data; and changing the thickness of a part in the second segment to the determined thickness of the following N-bit data.

In a more preferred embodiment a third segment is determined between the first and second segment and third segment is determined with a fixed length and/or with a fixed thickness. Preferably the fixed thickness is different from the thicknesses ($T_{N,i}$) of all values of N-bit data. This makes the distinctions between following N-bit data while decoding easier.

The plane filling line pattern with embedded identification code is preferably in the identification decoding method, image captured by a digital imaging device comprised in a mobile device; and wherein the mobile device is selected from a mobile computer, such as a computer tablet or mobile phone, such as a smart phone.

In a preferred embodiment the plane filling line pattern with embedded identification code is used to read the content about the item on which the plane filling line pattern with embedded identification code is attached.

REFERENCE SIGNS LIST

TABLE 0001

| | |
|---|---|
| 100 | GENERATE |
| 105 | A plane filling line pattern |
| 200 | DETERMINE |
| 205 | A graphic object |
| 207 | A graphic object |
| 300 | SEARCH |
| 302 | Conditional search |
| 402 | Repeat overlay while condition of the conditional search is granted |
| 400 | OVERLAY |
| 405 | A security pattern |

The invention claimed is:

1. A security pattern generation method comprising the steps of:
   generating a plurality of draw instructions to define a plane filling line pattern in a determined plane, the plane filling line pattern including a repeating sub-pattern that represents a line, bounded by two distinct end points, and the repeating sub-pattern is defined by a draw instruction or a sequence of draw instructions among the plurality of draw instructions;
   determining a vector graphic as a graphic object; and
   searching the repeating sub-pattern in the plurality of draw instructions with a determined condition and, if a match is found, overlaying the line of the found repeating sub-pattern by the determined graphic object which is scaled to fit between the two distinct end points of the line and located between the two distinct end points of the line; wherein
   the overlaying step includes:
      replacing the found repeating sub-pattern by draw instructions of the scaled and located determined graphic object; or
      adding draw instructions of the scaled and located determined graphic object to the plurality of draw instructions.

2. The method according to claim 1, wherein the plane filling line pattern is selected from a FASS curve, a space-filling curve, a self-similar fractal curve, a de Rham curve, a space-filing tree, a maze, a fret pattern, a kolam pattern, an interlace pattern, or a labyrinth.

3. The method according to claim 2, wherein the plane filling line pattern includes another repeating sub-pattern which defines another line, bounded by two distinct end points, by another draw instruction or another sequence of draw instructions; and
   the method further comprises searching the another repeating sub-pattern in the plurality of draw instructions with another determined condition and, if a match is found, overlaying the another line of the found another repeating sub-pattern by the another determined graphic object which is scaled to fit between the two distinct end points of the anther line and located between the two distinct end points of the another line.

4. The method according to claim 3, wherein the step of overlaying the another line of the found another repeating sub-pattern includes the step of replacing the found another repeating sub-pattern by the scaled and located another determined graphic object.

5. The method according to claim 1, further comprising the step of:
   selecting a Lindenmayer system with an alphabet of vector draw instructions to define the plane filling line pattern; wherein
   the plurality of draw instructions includes a plurality of step-by-step vector draw instructions generated by the Lindenmayer system; and
   the draw instruction is a vector draw instruction from the alphabet of vector draw instructions or the sequence of draw instructions is a sequence of vector draw instructions from the alphabet of vector draw instructions.

6. The method according to claim 5, wherein the overlaying step includes avoiding overlap between the graphic object and the plane filling line pattern by:
   rotating the graphic object according to an arctangent between the two distinct end points of the line from the repeating sub-pattern; and/or
   scaling the graphic object.

7. The method according to claim 6, wherein the graphic object inherits a line thickness or color and/or dashed line characteristics of the repeating sub-pattern.

8. The method according to claim 5, wherein the overlaying step includes the step of transforming the searched draw instruction or the searched sequence of draw instruction partially or fully to a zero thickness line.

9. The method according to claim 1, wherein the searching step is a conditional searching step in which the determined condition is based on a position of searching in the plurality of draw instructions.

10. The method according to claim 9, further comprising the step of:
   overlaying the line of the found repeating sub-pattern by searching from a start or a determined start position until an end or a determined end position in the plurality of draw instructions every $N^{th}$ time the repeating sub-pattern is found by the determined graphic object, wherein N is more than one.

11. The method according to claim 10, further comprising the steps of:
   determining another vector graphic as another graphic object; and
   overlaying by searching from a start or another determined start position until an end or another determined end position in the plurality of draw instructions every $M^{th}$ time the line of the found repeating sub-pattern by the determined other graphic object, wherein M is more than one and not equal to N.

12. The method according to claim 1, wherein the determined graphic object is a vector graphic defined by a set of the draw instructions.

13. The method according to claim 12, wherein the determined graphic object is equal to the repeating sub-pattern but with another line-thickness and/or another color and/or another dashed line characteristic.

* * * * *